United States Patent
Groll

(10) Patent No.: US 7,980,171 B2
(45) Date of Patent: Jul. 19, 2011

(54) VACUUM COOKING OR WARMING APPLIANCE

(75) Inventor: William A. Groll, McMurray, PA (US)

(73) Assignee: All-Clad Metalcrafters LLC, Canonsburg, PA (US)

( * ) Notice: Subject to any disclaimer, the term of this patent is extended or adjusted under 35 U.S.C. 154(b) by 1243 days.

(21) Appl. No.: 11/439,507

(22) Filed: May 23, 2006

(65) Prior Publication Data
US 2006/0272517 A1 Dec. 7, 2006

Related U.S. Application Data

(63) Continuation-in-part of application No. 11/245,478, filed on Oct. 6, 2005.

(60) Provisional application No. 60/616,801, filed on Oct. 7, 2004.

(51) Int. Cl.
*A47J 37/07* (2006.01)
*F24H 7/00* (2006.01)

(52) U.S. Cl. ............ 99/340; 99/339; 99/376; 99/452; 99/DIG. 14; 99/DIG. 10; 126/375.1; 126/374.1; 126/390.1; 219/458.1; 219/459.1; 219/465.1; 219/466.1; 219/468.1; 219/439; 219/440; 219/651; 219/625; 219/430; 219/601; 219/621; 219/730

(58) Field of Classification Search .......... 99/340, 99/339, 376, 452.13, 452, DIG. 14, DIG. 10; 219/458.1, 459.1, 465.1, 466.1, 468.1, 439, 219/440, 651, 625, 430, 601, 621, 730; 126/375.1, 126/374.1, 390.1
See application file for complete search history.

(56) References Cited

U.S. PATENT DOCUMENTS

| | | | |
|---|---|---|---|
| 2,196,484 A * | 4/1940 | Wentworth | 219/449.1 |
| 2,253,577 A * | 8/1941 | Pearson et al. | 338/23 |
| 2,343,470 A * | 3/1944 | Nast | 126/390.1 |
| 2,539,541 A * | 1/1951 | Kelley | 99/281 |
| 2,547,402 A * | 4/1951 | Lucas et al. | 219/449.1 |
| 2,664,492 A * | 12/1953 | Fischer | 219/456.1 |
| 2,685,522 A * | 8/1954 | Dunmire | 426/487 |
| 2,820,881 A * | 1/1958 | Huck | 219/441 |
| 2,906,192 A * | 9/1959 | Oakes | 99/282 |
| 2,939,606 A | 6/1960 | Durbin | |
| 3,042,974 A * | 7/1962 | Gerstenmaier et al. | 264/552 |
| 3,130,288 A * | 4/1964 | Monaco et al. | 219/385 |
| 3,376,652 A * | 4/1968 | Hernandez, Jr. | 34/292 |
| 3,686,477 A * | 8/1972 | Dills et al. | 219/455.12 |
| 3,742,178 A | 6/1973 | Harnden, Jr. | |
| 3,748,196 A * | 7/1973 | Kemeny | 228/119 |
| 3,909,591 A * | 9/1975 | Ulam | 219/438 |
| 3,909,592 A * | 9/1975 | Eide | 219/465.1 |
| 4,339,993 A | 7/1982 | Lee | |
| 4,431,908 A * | 2/1984 | Fischer et al. | 219/465.1 |
| 4,653,469 A | 3/1987 | Miyaji et al. | |
| 4,668,562 A | 5/1987 | Street | |
| 4,717,810 A * | 1/1988 | Schreder | 219/461.1 |

(Continued)

*Primary Examiner* — Sang Y Paik
*Assistant Examiner* — Brett Spurlock
(74) *Attorney, Agent, or Firm* — The Webb Law Firm

(57) ABSTRACT

A cooking or food warming appliance having a heated heat sink plate situated in a vacuum environment within an outer shell. A food vessel intimately engages the heat sink plate along a food contacting surface thereof by virtue of the vacuum. The vacuum eliminates air gaps between the food contacting surface of the food vessel and the heat sink plate so as to provide instantaneous and uniform heating of the food vessel. The vacuum environment also provides thermal insulation for the heat sink plate whereby heat loss by convection is virtually eliminated.

15 Claims, 2 Drawing Sheets

U.S. PATENT DOCUMENTS

| | | | |
|---|---|---|---|
| 4,734,995 A * | 4/1988 | Pagnozzi et al. | 34/406 |
| 4,790,292 A * | 12/1988 | Kuhn | 219/621 |
| 4,993,607 A * | 2/1991 | Brun et al. | 222/590 |
| 5,077,072 A * | 12/1991 | Sieradzki | 426/523 |
| 5,422,055 A | 6/1995 | Yalvac et al. | |
| 5,422,459 A * | 6/1995 | Zhou | 219/465.1 |
| 5,513,558 A | 5/1996 | Erickson et al. | |
| 5,567,458 A | 10/1996 | Wu | |
| 5,578,160 A * | 11/1996 | Krznarich et al. | 156/462 |
| 5,596,921 A * | 1/1997 | Kuwana et al. | 99/340 |
| 5,643,485 A * | 7/1997 | Potter et al. | 219/621 |
| 5,655,434 A * | 8/1997 | Liebermann | 99/330 |
| 5,699,722 A | 12/1997 | Erickson et al. | |
| 5,727,448 A | 3/1998 | Sa | |
| 5,767,487 A | 6/1998 | Tippmann | |
| 5,813,851 A * | 9/1998 | Nakao | 432/6 |
| 5,975,629 A * | 11/1999 | Lorbiecki | 297/200 |
| 6,073,545 A | 6/2000 | Huppi et al. | |
| 6,109,504 A | 8/2000 | Groll | |
| 6,131,646 A * | 10/2000 | Kelley | 165/80.1 |
| 6,152,024 A | 11/2000 | Tippmann | |
| 6,197,428 B1 | 3/2001 | Rogers | |
| 6,283,014 B1 * | 9/2001 | Ng et al. | 99/330 |
| 6,305,272 B1 | 10/2001 | Lin | |
| 6,340,807 B2 | 1/2002 | Wang | |
| 6,360,423 B1 | 3/2002 | Groll | |
| 6,544,669 B2 | 4/2003 | Groll | |
| 6,545,252 B2 | 4/2003 | Wang | |
| 6,565,903 B2 | 5/2003 | Ng et al. | |
| 6,576,876 B2 | 6/2003 | Cartossi | |
| 6,992,268 B2 | 1/2006 | Kim | |
| 7,012,229 B2 | 3/2006 | Kim | |
| 7,353,981 B2 | 4/2008 | Groll | |
| 7,378,623 B2 | 5/2008 | Tarenga | |
| 7,488,515 B2 | 2/2009 | Groll | |
| 2003/0213793 A1 | 11/2003 | Cole, Sr. et al. | |
| 2007/0045282 A1 | 3/2007 | Petrenko | |

* cited by examiner

VACUUM COOKING OR WARMING APPLIANCE

CROSS REFERENCE TO RELATED APPLICATIONS

This application is a continuation-in-part of co-pending U.S. application Ser. No. 11/245,478 filed Oct. 6, 2005, and is hereby incorporated by reference in its entirety.

BACKGROUND OF THE INVENTION

1. Field of the Invention

The present invention relates generally to electric cooking appliances and, more particularly, to an electric cooking or food warming appliance having a thin food contacting surface, preferably of stainless steel, that intimately engages a thicker heat conductive core or heat sink plate of copper or aluminum by means of a vacuum to maximize heating uniformity and minimize heat loss.

2. Description of Related Art

Briefly stated, the invention disclosed in parent application Ser. No. 11/245,478 is directed to a composite griddle plate comprising a core consisting of a metal plate having a high coefficient of thermal conductivity such as copper or aluminum. The core plate is faced at least with an upper sheet of a metal such as stainless steel or titanium which defines the cook surface of the griddle plate. The interface between the core plate and upper sheet is under the reduced pressure of a vacuum so as to cause intimate contact between the core and cook surface which increases the thermal conductivity to the cook surface and, thus, reduces the thermal recovery time of the griddle.

Various additional embodiments of the original invention are also disclosed in the parent application. For example, the griddle plate of one such embodiment comprises a high heat conductivity core of copper or aluminum having upper and lower sheets of stainless steel in intimate contact with the core. The entire perimeter of the griddle plate is sealed as by welding and the interior is under a permanently sealed vacuum. Another such embodiment utilizes an upper sheet of stainless steel or other metal having a non-stick coating applied thereto. The upper sheet is removably secured to the heat conductive core plate under vacuum utilizing a high temperature gasket or adhesive sealant to maintain the vacuum. The upper sheet may be mechanically secured by bolts or the construction may be placed under a constant vacuum using a vacuum pump. When the non-stick surface ages and/or otherwise loses its non-stick properties, such as with a PTFE-type non-stick coating, the upper sheet can be easily replaced with a freshly non-stick coated upper sheet and the vacuum reestablished.

SUMMARY OF THE INVENTION

The present invention incorporates several aspects of the invention disclosed in parent application Ser. No. 11/245,478, namely, the attachment of a thin metal cook surface to a thicker core layer or heat sink by way of a vacuum to ensure uniform surface contact between the cook surface and the heat sink which provides instant heating as well as uniform heating over the entire cook surface. The subject parent application also discloses the removability of the cook surface from the heat sink through the use of a vacuum pump and high temperature gasket sealing around the perimeter of the cooking surface. The removability feature is particularly beneficial when a non-stick PTFE type surface is present on the cook surface since it permits periodic replacement of the cook surface and its non-stick surface.

Briefly stated, a presently preferred embodiment of the present invention comprises a heat sink plate with heating means associated therewith. The heat sink is surrounded by a vacuum when in use so as to provide a heat insulating environment for the heat sink so as to minimize heat loss and maximize energy efficiency. A food vessel tightly engages the heat sink along the cook surface thereof by virtue of the vacuum. In preferred embodiments, the invention contemplates that the heat sink is enclosed by a metal pot-shaped shell which communicates with a vacuum pump. The invention includes sealing means to contain the vacuum between the shell and the food vessel.

The food vessel is removable from vacuum engagement with the shell and heat sink to permit easy cleaning thereof. When the food vessel is so removed, the heat sink may be preheated or maintained at temperature under vacuum through the use of a lid which engages the sealing means and maintains the vacuum within the shell and around the heat sink. When the food vessel is prepared and loaded with ingredients for cooking, the vacuum is halted to permit removal of the lid and insertion of the food vessel in the shell. The vacuum is again established around the heat sink for heat insulation of the heat sink and for tight engagement between the heat sink and the cook surface of the food vessel.

DETAILED DESCRIPTION OF THE INVENTION

Figure 1:
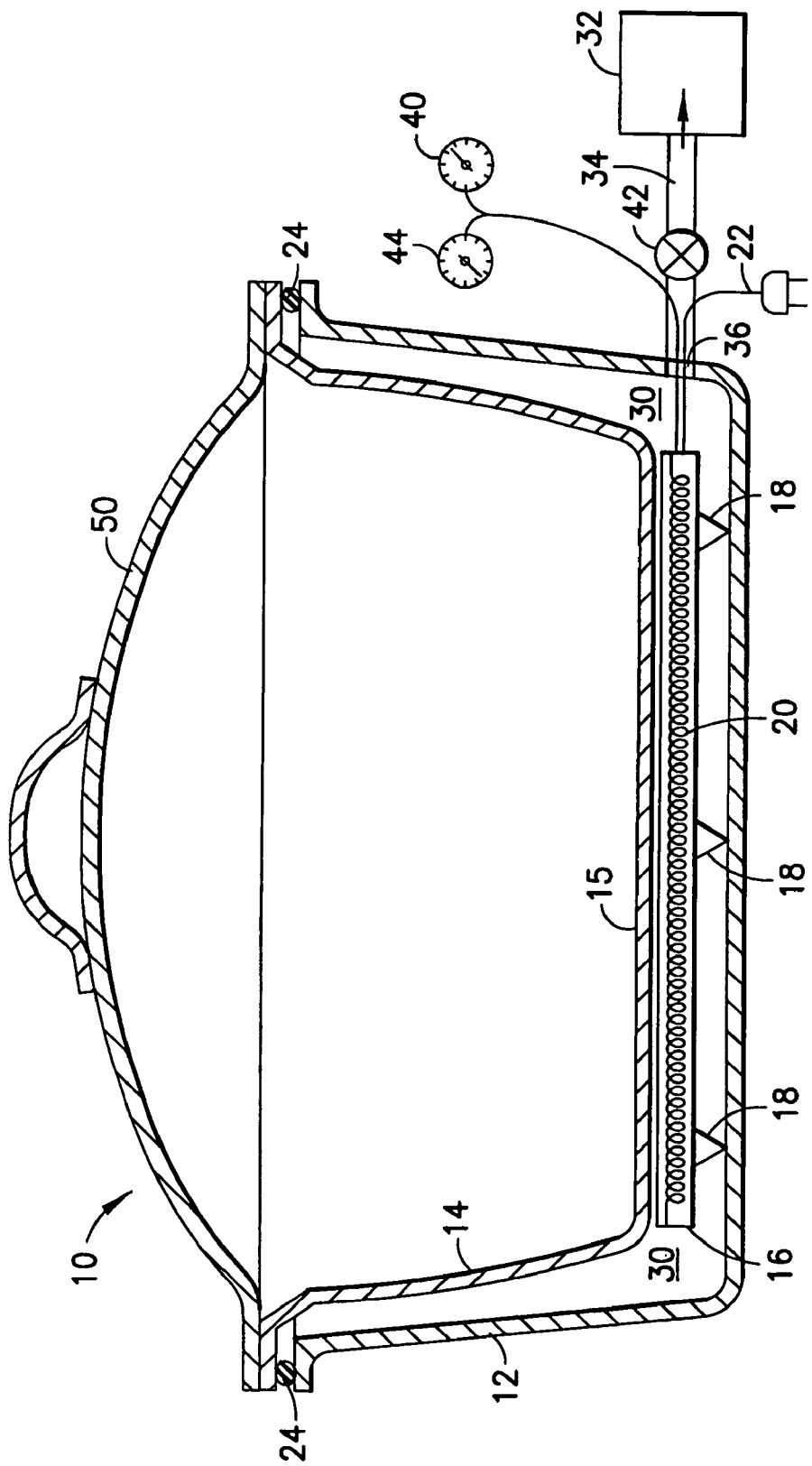
FIG. 1 is a cross-sectional view of the construction of one presently preferred embodiment of the vacuum cooking appliance of the present invention.
Figure 2:
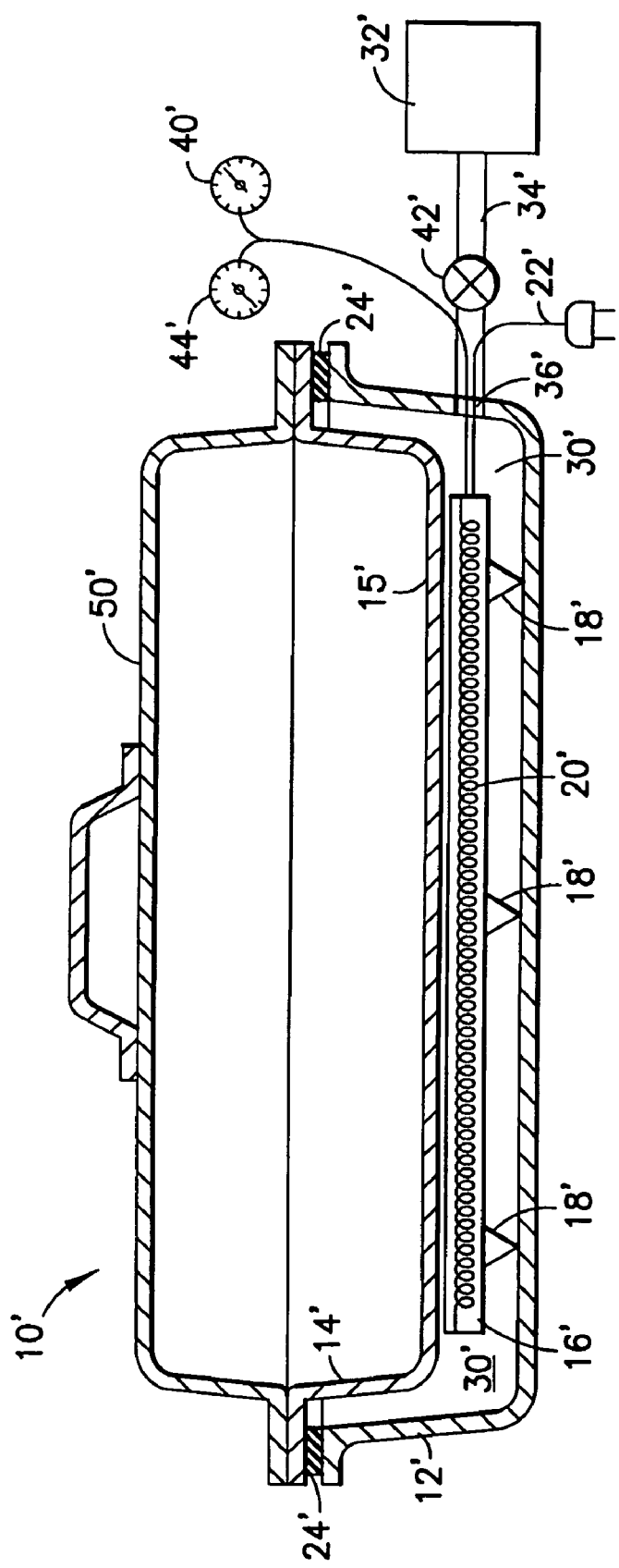
FIG. 2 is a cross-sectional view of another embodiment of the vacuum cooking appliance of the present invention.

Food preparation with an electrical cooking device represents certain advantages such as portability and versatility, and certain drawbacks such as lack of ease of cleaning, evenness of heating, and safety. The present invention provides an electrical cooking apparatus with unique features in construction and performance that addresses the shortcomings of the traditional electrical cooking apparatus. The central feature of this appliance is the use of vacuum as both an insulator and as a means of attaching the cooking vessel to the heat source. FIGS. 1 and 2 schematically depict several generic arrangements of the apparatus of the present invention.

The vacuum cooking appliance 10 shown in FIG. 1 is suitable for use as a food cooking or warming apparatus and particularly as a slow cooker corn popper or similar device. The appliance 10 includes an outer shell 12, an inner food contacting vessel 14, and a heat sink plate 16 supported within the shell 12 by support legs 18. A resistance heater 20 is associated with the heat sink plate 16 having an external power cord and plug 22 associated therewith to supply electrical energy thereto. A ring-shaped gasket 24 positioned between outwardly flared flanged rims of the shell 12 and food vessel 14 provides a vacuum tight seal between the shell and vessel when the interior space 30 between shell 12 and food vessel 14 is evacuated by a vacuum pump 32. The vacuum pump 32 communicates with the interior space 30 by way of a conduit 34 and passage 36 formed through the wall of the shell 12. Controls include a thermostat 40, solenoid 42 and vacuum switch 44. A lid 50 is also preferably included to cover the food vessel 14 when in use and also during preheat.

Overview

A vacuum is created in the interior space 30 defined between the outer shell 12 and the food vessel 14 by the vacuum pump 32. The high temperature seal 24 is somewhat compressible which allows the bottom wall or cook surface 15 of the food vessel 14 to come into intimate contact with the heat sink 16 as vacuum builds in space 30. The heat sink 16 is a thicker plate of metal (copper, aluminum, steel, etc.) which is intended to store latent energy from the resistance heater 20, then deliver that energy in a rapid and even manner to the cook surface 15 of the food vessel 14. The mass of the heat sink plate 16 is adjusted to fit the application of the apparatus 10. The heat sink plate 16 is preferably one of aluminum or copper.

The temperature of the heat sink 16 is controlled by the thermostat 40 which has a probe connected directly to the heat sink or by means of a non-contact sensing device. The elements of the resistance heater 20 may be mechanically attached to the heat sink 16 or may be cast into the heat sink. The wattage of the resistance heaters is adjusted according to the application of the apparatus 10. The lid 50 is provided which securely fits the outer shell 12 as well as the food preparation vessel 14. During a pre-heat period, the lid 50 is placed on the high temperature gasket 24 without the food vessel placed in the outer shell. The vacuum pump 32 is turned on and the resulting vacuum that is developed in the interior space defined between the lid 50 and shell 12 insulates the heat sink plate 16 during the heat-up period. To start the cooking cycle, the solenoid 42 opens and vents the evacuated space between the outer shell 12 and lid 50 so that the lid may be removed and the food vessel 14 put in place inside the shell 12. The vacuum switch 44 turns on the vacuum pump 32 and the thermostat 40 turns on the resistance heaters 20 as energy flows to the food vessel. The legs 18 which support the heat sink 16 provide a spaced gap between the bottom of the heat sink 16 and the outer shell 12. The height of the legs is adjusted to place the heat sink 16 in contact with the surface 15 of the vessel 14 so as to provide maximum clamping force between the food vessel 14 and heat sink 16 when the vacuum is applied. This great clamping force is possible by virtue of the fact that the space 30 is under vacuum while the space above the food vessel is at atmosphere. The resultant net force acting to press the surface 15 against the heat sink 16 may be well in excess of 1,000 pounds. The lid 50 which was used to maintain the vacuum during the pre-heat period fits the food vessel 14 and can be used as a lid during the cooking cycle.

The food vessel 14 can be made from a food grade material such as stainless steel or a less expensive material which is coated with a synthetic material such as a PTFE (non-stick). A multi-ply bonded material of stainless steel-aluminum-stainless steel, for example, would also be useful as a material for the food vessel 14 to promote heat flow to the vessel and to conduct heat throughout the vessel.

The wires to the resistance heater 20 and the thermostat 40 must pass through the outer shell 12, such as through port 36, without allowing loss of vacuum. This is accomplished through the use of appropriate gaskets and sealants. The vacuum port 36 to the outer shell can also double as the entry point for these wires to minimize the number of possible vacuum leakage points in the outer shell 12. Energy consumption is minimized by the design of the apparatus as outlined below.

A. Convection loss is minimized by the evacuation of the space 30 surrounding the heat sink 16 during the heat-up period. Convection loss is minimized during the cooking cycle by reestablishing the vacuum after the lid has been removed and the food vessel 14 has been put in place in a sealed relationship at gasket 24 with the outer shell 12.

B. Conduction losses are minimized by using a low conductivity material for the heat sink support legs 18 such as stainless steel or ceramics to space the heat sink plate 16 from the shell 12. Also, the contact points for the legs 18 are kept to a minimum. Hence, loss of heat by conduction from the heat sink plate 16 to the shell 12 is minimized.

C. Radiant losses are minimized by providing a smooth reflective surface for the heat sink 16, the interior and the exterior of the outer shell 12.

Operation

With the food vessel 14 removed from the outer shell 12, the lid 50 is placed on the vacuum seal 24 that is located at the top flange of the outer shell 12. The apparatus 10 is turned on and the lid 50 is drawn down by the differential between the atmospheric pressure outside the lid and the vacuum beneath the lid, and the heat sink 16 begins to heat by virtue of the resistance heater 20. When the apparatus has achieved the pre-set vacuum level (approximately 23 inches of mercury) and the desired pre-set temperature, both the vacuum pump 32 and resistance heater 20 turn off. When desired, the operator switches the solenoid valve 42 which vents the evacuated space between the food vessel and the outer shell to atmosphere to free the lid. The lid is removed from the outer shell and the food vessel 14 with the food to be cooked thereon is placed inside the outer shell 12 with the upper flange of the food vessel 14 resting on the high temperature seal 24. Vacuum is reestablished and a tight clamping force is generated between the cook surface 15 of the food vessel 14 and the heat sink 16. When the cooking cycle is finished, the food vessel 14 is removed and the unit is either turned off or the lid is replaced on the vacuum seal to maintain the heat in the heat sink 16.

Advantages

Among the advantages provided by the present invention are the following:

A. Preheat—The time to preheat is separate from the cooking cycle. The apparatus can be left turned on and ready to cook but in an idle mode that is consuming little energy because the heat sink is surrounded by a vacuum.

B. Even Heating—The heat delivered to the cook surface 15 of the food vessel 14 is completely evenly distributed throughout the heat sink 16. The high clamping force of atmospheric pressure eliminates air gaps between the heat sink 16 and the cook surface 15 to thus assure well distributed delivery of the latent energy in the heat sink to the cook surface.

C. Speed—The delivery of heat energy to the cook surface 15 of the food vessel 14 is instantaneous.

D. Accuracy—The thermostatically controlled heater 20 in the heat sink 20 delivers no more and no less than the desired temperature.

E. Easy Cleaning—The detachable food vessel 14 is easily removed for cleaning.

F. Simplicity—The technology of the apparatus is very simple and involves no complicated electronics.

G. Energy Efficiency—The design of this apparatus minimizes consumption of energy. When cooking, the energy yielded from the heat sink is conducted straight to the food being processed.

H. Safety—When used in a situation such as a buffet serving dish, there is no hot water or fuel container to present a safety hazard. There are no high frequency electromagnetic waves that could affect biomedical devices.

Possible Applications:

| | |
|---|---|
| Chafing Dishes | Panini Press |
| Slow Cookers | Waffle Maker |
| Rice Makers | Fun Foods (popcorn, cheese melt) |
| Commercial Warming Trays | Commercial Braziers |
| Grill tops | Coffee Makers |
| Electric Fry Pans | Various Serve Ware |
| Two-sided Grill | Soup Tureens |

EXAMPLES OF INVENTION

Example 1

Popcorn Maker

An apparatus 10, as depicted in FIG. 1, with an outer shell 12 of approximately 10" circular diameter is fitted with a high temperature gasket 24 of a compressible nature around the top rim. A strong and well-insulated lid 50 is placed on the rim without the presence of a food vessel 14 and the apparatus is turned on for preheating. The preset temperature (350° F.) and vacuum (23 inches Hg) are quickly achieved and the vacuum pump 32 and resistance heater 20 automatically shut off. The apparatus sits in an idle state at temperature and under vacuum until cooking is desired. At that time, a food vessel 14 has ½ cup of vegetable oil and 1 cup of popcorn placed therein. The vacuum is vented to atmosphere by way of solenoid valve 42, the lid 50 is removed and the food vessel 14 with the oil and popcorn therein is placed on the vacuum seal 24. The vacuum pump 32 is then restarted. The lid that was previously on the outer shell during preheat is now placed on the food vessel 14 as the vacuum in the sealed-off space 30 between the food vessel 14 and the outer shell 12 increases. The vacuum condition forces the cook surface 15 to forcibly engage the heat sink plate 16. Energy rapidly conducts to the cook surface 15 of the food vessel and then to the oil and popcorn. The popcorn is processed in less than 2 minutes, leaving no unpopped kernels. After releasing the vacuum, the food vessel 14 is removed and the lid is put back on the outer shell rim. The vacuum and heat sink temperature are reestablished to the idle state where the temperature of 350° F. is maintained in the heat sink plate 16. The popping cycle is repeated with very little heat loss and minimized energy consumption. After use, the food vessel 14 may be completely immersed in water for ease of cleaning.

Example 2

Griddle

The apparatus depicted in FIG. 2 with reference to Example 2 has generally the same structural elements as the apparatus shown and described in FIG. 1. Accordingly, like elements will be designated with the same numerals, but with prime symbols added in FIG. 2.

As shown in FIG. 2, an apparatus 10' of the same generic construction as Example 1, but with an outer shell 12' of rectangular shape, for example, measuring 12 inches by 16 inches, is fitted with a strong, well-insulated lid 50' that will withstand the atmospheric pressure without collapsing under vacuum during the preheat period. The plane of the heat sink 16' is only ⅛" below the plane of the top of the vacuum seal 24' in its uncompressed state. The apparatus reaches preset heat and vacuum levels and idles. When desired, the vacuum is broken and the lid 50' is removed and replaced with a flat thin sheet of stainless steel or titanium which acts as a food vessel 14' in the form of a griddle cooktop 15'. Atmospheric pressure secures the stainless sheet defining food vessel 14' in place at the seal 24' and on the heat sink plate 16'. The latent energy from the heat sink 16' allows meat, such as hamburger patties, to be cooked rapidly and evenly across the griddle plate cooktop 15'. By way of example, the heat sink plate 16' may be an aluminum plate about 0.75 inches thick and the food vessel 14' may be a sheet of 304 stainless steel having a thickness of about 0.017 inches. The preheat lid 50' fits over the stainless sheet 14' to promote cooking, minimize heat loss and prevent splatter. Since the griddle cooktop 15' is in intimate contact with the heat sink plate 16' by virtue of the vacuum condition within the interior 30', the cooktop 15' will remain at a constant temperature over its entire surface and will also experience almost instantaneous thermal recovery when cold or frozen food is placed on the surface of cooktop 15'. This is particularly advantageous in commercial griddles where frozen hamburger patties are cooked. Thus, the invention ensures uniform and safe cooking in a commercial food preparation environment.

Example 3

Two-Sided Grill/Waffle Maker

Two outer shells (not shown, but similar in concept to shell 16) are attached by a hinge in a "clam shell" type of arrangement. Both halves are equipped with a heat sink 16 and a port 36 to a vacuum pump 32. When the two halves are closed on each other, high temperature seals 24 around the perimeter of each shell contact the other. In other words, the clam shell is closed and the vacuum seal of each half contacts the other half. Vacuum is established and the heat sinks 16 in each half are preheated to a desired temperature. When desired, the vacuum is vented to atmosphere and the claim shell is opened. Grill vessel plates 14 which may include cast aluminum with a non-stick coating are placed against the vacuum seals 24 and vacuum is established in each of the two halves. When the clam shell is closed again, it may be used as a waffle maker, a two-sided grill, a panini press, or any other two-sided heat source application. The usage is determined by the plates or sheets 14' which are vacuum attached to the heat sinks 16 within the outer shells 12.

Example 4

Warming Pan/Chafing Dish

This example is similar to Example 1, however, the outer shell 16, food preparation vessel 14 and lid 50 may be shaped in a rectangular configuration (in plan view) to assume the general size and configuration of a commercial warming tray or chafing dish. In such commercial settings, it is important to maintain the already cooked food at a holding/serving temperature between about 167° F.-185° F. This temperature range is of importance because bacteria will grow at temperatures below 167° F. and cooking will continue at temperatures above 185° F. The operation of the food warming device of this example is the same as that set forth in the previous examples except that the temperature of the heat sink plate is maintained between 167° F.-185° F. so that precooked food placed in the food vessel 14 remains at a safe temperature during holding/serving without being overcooked.

The invention claimed is:

1. A cooking or warming appliance comprising:
   a. an outer shell;
   b. a food vessel having a cooking surface on an interior surface, said food vessel removably positioned within the outer shell and defining a space between an exterior surface of the food vessel and an interior surface of the outer shell when the food vessel is placed therein;
   c. sealing means co-acting between the outer shell and the food vessel;
   d. means for selectively activating and deactivating a vacuum condition in said space;
   e. a metal heat sink plate positioned within said space, adapted to forcibly and uniformly contact the exterior surface of the food vessel beneath said cooking surface when the vacuum is activated;
   f. electric heating means positioned within said space to heat said heat sink plate when the vacuum is activated; and
   g. means for spacing said heat sink plate and heating means from the interior surface of the outer shell, whereby said vacuum condition when activated surrounds said heat sink plate and heating means within said outer shell to permit heat to pass only by conduction from the heat sink plate to said cooking surface.

2. The appliance of claim 1 wherein the heating means comprises a resistance heater associated with the heat sink plate and the heat sink plate is made from one of copper or aluminum.

3. The appliance of claim 1 wherein the support means is one or more support legs.

4. The appliance of claim 1 wherein interior surfaces of the outer shell and heat sink are treated to reduce radiant heat losses.

5. The appliance of claim 1 including a lid to selectively cooperate with the sealing means when the food vessel is removed from the outer shell to provide a sealed interior within the outer shell for creation of a vacuum during one of preheat or idle at temperature.

6. The appliance of claim 5 wherein the lid is adapted to fit on said food vessel.

7. A food cooking or warming appliance comprising:
   a. an outer shell;
   b. a heat sink plate positioned within the interior of the outer shell;
   c. electric resistance heating means positioned within the shell associated with the heat sink plate for heating the plate to a desired temperature;
   d. a removable food vessel for selective placement within the outer shell, said vessel having a food contacting surface for placement adjacent to said heat sink plate;
   e. a lid adapted to selective engagement with one of the outer shell or the food vessel;
   f. a vacuum pump means communicating with the interior of the outer shell to selectively create a vacuum around the heat sink plate and heating means, and between the outer shell and one of the removable food vessel or lid, wherein said vacuum pump means is selectively deactivated to permit removal of one of the food vessel or lid from the outer shell; and
   g. a sealing means cooperating between one of the lid and the outer shell or between the food vessel and the outer shell.

8. The appliance of claim 7 in the form of a popcorn maker.

9. The appliance of claim 7 in the form of a slow cooker.

10. The appliance of claim 7 in the form of a food warming chafing dish.

11. The appliance of claim 7 in the form of a fry pan or grill.

12. A method of cooking or warming food comprising the steps of:
    a. providing an outer shell;
    b. providing a heat sink plate and electric heating means within the outer shell;
    c. providing vacuum means for selectively providing a vacuum around the heat sink plate and the heating means;
    d. providing a removable food vessel for placement in the outer shell whereby the food vessel forcibly and intimately contacts the heat sink plate, when the vacuum condition exists in a space between the food vessel and the outer shell, whereby the vacuum prevents heat loss through the outer shell;
    e. providing removable lid means adapted to selectively fit the outer shell and the food vessel;
    f. providing sealing means to selectively establish a vacuum tight seal between one of the lid and the outer shell during a preheating step and between the food vessel and the outer shell during a cooking or warming step; and
    g. deactivating the vacuum means to permit selective removal of one of the lid means or food vessel from the outer shell after respective preheating and cooking or warming steps.

13. The method of claim 12 wherein the preheating step comprises the steps of
    a. placing the lid on the outer shell to engage said sealing means;
    b. activating the vacuum means to create a vacuum environment within an interior space defined by said outer shell and said lid;
    c. energizing the heating means within the vacuum environment to obtain a desired preheat temperature and maintaining said temperature; and
    d. deactivating the vacuum means to permit removal of the lid from the outer shell and placement of the cooking vessel in the outer shell.

14. The method of claim 13 wherein the cooking or warming step comprises the steps of:
    a. placing the food vessel in the outer shell to engage said sealing means;
    b. activating the vacuum means to create a vacuum environment within an interior space defined by said outer shell and said food vessel, said vacuum environment causing forcible and intimate engagement between the food vessel and the heating means as well as insulating said heating means from convection heat losses; and
    c. deactivating the vacuum means to permit removal of the cooking vessel from the outer shell upon completion of the cooking step.

15. The appliance of claim 1 in the form of one of a popcorn maker, a slow cooker, a fry pan, or grill.

* * * * *

UNITED STATES PATENT AND TRADEMARK OFFICE
CERTIFICATE OF CORRECTION

| | | |
|---|---|---|
| PATENT NO. | : 7,980,171 B2 | Page 1 of 1 |
| APPLICATION NO. | : 11/439507 | |
| DATED | : July 19, 2011 | |
| INVENTOR(S) | : William A. Groll | |

It is certified that error appears in the above-identified patent and that said Letters Patent is hereby corrected as shown below:

Column 8, Line 34, Claim 13, "of" should read -- of: --

Signed and Sealed this
Eighth Day of November, 2011

David J. Kappos
*Director of the United States Patent and Trademark Office*